United States Patent
Johnson et al.

(10) Patent No.: US 6,205,477 B1
(45) Date of Patent: Mar. 20, 2001

(54) APPARATUS AND METHOD FOR PERFORMING TRAFFIC REDIRECTION IN A DISTRIBUTED SYSTEM USING A PORTION METRIC

(75) Inventors: Richard A. Johnson, Santa Barbara; Dhaval N. Shah, Santa Clara; Dalen D. Bosteder, San Jose, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/175,195

(22) Filed: Oct. 20, 1998

(51) Int. Cl.[7] .................................................. G06F 15/177
(52) U.S. Cl. ........................ 709/220; 709/223; 709/203
(58) Field of Search .................................... 709/203, 223, 709/220

(56) References Cited

U.S. PATENT DOCUMENTS 5,918,017 * 6/1999 Attanasio et al. .................... 709/224

OTHER PUBLICATIONS

Cisco Systems, Inc., "Cisco DistributedDirector," 1996, 9 pp.

* cited by examiner

*Primary Examiner*—Kenneth R. Coulter
(74) *Attorney, Agent, or Firm*—Beyer Weaver & Thomas, LLP

(57) ABSTRACT

A method and system for distributing a service request among a plurality of servers is disclosed. A portion metric is assigned to each one of the plurality of servers, the portion metric designating a portion of total server requests to be allocated to the one of the plurality of servers. A server request may then be received. A total number of server requests processed by the plurality of servers is incremented and a number of server requests distributed to each one of the plurality of servers is maintained. The server request is then distributed to one of the plurality of servers using the portion metric assigned to each one of the plurality of servers, the number of server requests distributed to each one of the plurality of servers, and the total number of server requests.

37 Claims, 6 Drawing Sheets

APPARATUS AND METHOD FOR PERFORMING TRAFFIC REDIRECTION IN A DISTRIBUTED SYSTEM USING A PORTION METRIC

CROSS-REFERENCE TO RELATED APPLICATION

This application is related to U.S. application Ser. No. 09/175,673 filed on the same day entitled "A System and Method for Determining a Preferred Service in a Network", and U.S. application Ser. No. 09/175,516 filed on the same day and entitled "A System and Method for Information Retrieval Regarding Services".

BACKGROUND OF THE INVENTION

1. Field of the Invention

The present invention relates generally to traffic redirection in a distributed system. More particularly, the present invention relates to a method and apparatus for redirecting traffic among a number of servers using a portion metric for each server.

2. Description of the Related Art

A computer network may be defined as an interconnected collection of autonomous computers. In a distributed system, the existence of these multiple autonomous computers is transparent to the user. To achieve this transparency, allocation of jobs to processors and all other system functions must be automatic. These automated system functions are typically provided by an operating system.

In general, the operating system hides the details of the hardware from the user and provides the user with a convenient interface for using the system. More particularly, the operating system is responsible for allocating resources within the distributed system and schedules the execution of various services accordingly. Thus, the operating system selects the best processor, locates and transfers all corresponding appropriate location. In this manner, the operating system ensures that system resources such as file servers are used in an efficient manner.

The resource allocation provided by the operating system includes the retrieval and processing of data. Often, this data is stored on one or more shared file servers. Users in such a system are called clients. Communication from a client generally comprises a request message asking for a particular service to performed. The service request message is then sent to an appropriate server. The server then does the work requested and sends back a reply. Thus, data is accessed and processed by the server in accordance with the service request message.

In order to send a service request message to a server, the operating system must first select an appropriate server. Typically, the operating system selects a server according to criteria that may be applied through the use of a metric. By way of example, a commonly used metric distributes the service request message to a server closest in distance to the client. Accordingly, the operating system may direct traffic to a server according to a specified metric.

Although various metrics exist for allocating resources within a network, these metrics do not adjust assignment of server requests in accordance with the load capacity of each server. By way of example, each server may have different processing capabilities. As yet another example, a server may be entirely unavailable. Metrics traditionally used in distributed systems do not adjust assignment of requests according to such situations. As a result, these metrics cannot adequately maximize the throughput of a distributed system having servers with heterogeneous load capabilities. It would be desirable if a metric were provided such that server requests could be distributed in accordance with the load capacity of each server.

Every host and router on the Internet has an IP address. The Domain Name System (DNS) is often used to map host names to these IP addresses. By way of example, a client typically sends a DNS query to a DNS server which includes a host name and an indication that an IP address is requested. The DNS server then returns an IP address associated with the host name. It would therefore be desirable if a DNS server were designed to accomplish load distribution compatible with the Internet and DNS.

In addition to ensuring adequate load distribution, it is necessary to accommodate for shifts of information. Information is commonly transferred from one web server to another web server on the Internet. Typically, a web server will redirect a client to a new location due to this physical shift of information between web servers. However, the host of the client is typically not taken into consideration during selection of the web server in providing this redirect. In many instances it would be desirable if the information could be selectively varied according to the particular client requesting the information. It would therefore be desirable if the host of the client were considered during selection of an appropriate web server in order to provide such a redirect. Moreover, it would be beneficial if the client could easily identify the server to which the server request is redirected.

In view of the above, a system and method for redirecting traffic in a distributed system according to individual server capabilities would be desirable. Additionally, it would be beneficial if such a system distributed traffic in proportion to individual server portion metrics.

SUMMARY OF THE INVENTION

The present invention provides a method and apparatus for distributing server requests among a plurality of servers in a distributed system. This is accomplished through assigning a portion metric to each server. In this manner, the portion metric allows capabilities of each candidate server to be taken into consideration during distribution of each server request.

In accordance with one aspect of the present invention, each server request is distributed in accordance with the Domain Name System (DNS). Configuration is performed in several steps. First, a Domain Name System host name is associated with a plurality of servers, each one of the servers having a unique IP address. By way of example, a DNS table on a DNS server typically includes a plurality of entries, each of the entries containing an IP address-host name association. Second, a portion metric is then assigned to each one of the plurality of servers. The portion metric designates a portion of total server requests to be allocated to the one of the plurality of servers. As a result, each web server is assigned a portion metric. Each portion metric designates a portion of total server requests to be allocated to the corresponding server. Once configuration is completed, server requests may be allocated.

Each server request is separately allocated to a selected web server. The server request may include a DNS host name query received from a client. By way of example, a DNS host name query may include a host name to be looked up and an indication that an IP address is requested. A plurality of IP addresses associated with the host name may then be obtained, each one of the IP addresses being associated with one of the plurality of servers. A total number of server requests processed by the plurality of servers is incremented. In addition, a number of server requests distributed to each one of the plurality of servers is maintained. One of the plurality of servers is selected using the portion metric assigned to each one of the plurality of servers, the number of server requests distributed to each one of the plurality of servers, and the total number of server requests. An IP address associated with the selected server is then provided to the client from which the server request was obtained. Accordingly, when each server request is received, one of the plurality of IP addresses is determined and provided to the client. In this manner, traffic sent to geographically distributed web servers in multiple networks may be distributed and monitored. Moreover, the present invention may be and is preferably geographically distant from the web servers. Thus, connections distributed to each web server may be monitored and load averages of each web server may be subsequently queried.

In accordance with another aspect of the present invention, the portion metric is used in combination with other metrics. A portion metric is assigned to each one of a plurality of servers. The portion metric for each one of the plurality of servers is added to obtain a total portion metric. A number of server requests distributed to each one of the plurality of servers is maintained. In addition, a total number of server requests processed by the plurality of servers is incremented. A server request is then received. A server request percentage is computed for each one of the plurality of servers. The server request percentage for each one of the plurality of servers is a product of the number of server requests distributed to the one of the plurality of servers and the total portion metric divided by the total number of server requests received. In addition, a metric value is calculated for each one of the plurality of servers. The metric value for one of the plurality of servers is defined by the server request percentage for the one of the plurality of servers and the portion metric for the one of the plurality of servers. The metric values for the plurality of servers are compared to obtain a selected server.

The selected server may include a set of servers. The set of servers may include those servers having an identical metric value. Alternatively, a tolerance range may be configured for the portion metric. The tolerance range may then be used in comparing the metric value for each of the servers. Thus, a set of the plurality of servers having a metric value within the tolerance range may be obtained. An alternate metric may then be applied to the set of servers to obtain a single selected server. By way of example, the alternate metric may include a distance metric. The selected server is then provided to the client.

In accordance with yet another aspect of the invention, load imbalance may be detected. As described above, a set of the plurality of servers is obtained upon application of the portion metric. When the set of the plurality of servers includes only one server, this may indicate the presence of load imbalance. By way of example, if there is a large disparity in the amount of server requests distributed to each server, there will be one server that has received the least amount of server requests, and this server will therefore be selected. A report may be generated indicating the presence of this load imbalance in the distributed system. Moreover, the detection of load imbalance permits reallocation of servers as well as the reconfiguration of portion metrics and tolerance ranges.

In accordance with a further aspect of the invention, a portion metric is assigned to each server. An HTTP connection is accepted. A total number of server requests processed by the plurality of servers is incremented. In addition, a number of server requests distributed to each of the servers is maintained. One of the plurality of servers is then selected using the portion metric assigned to each of the servers, the number of server requests distributed to each of the servers, and the total number of server requests. An HTTP code redirect is then sent to the client. Therefore, information provided to a client may be selectively varied according to the particular client requesting the information.

The advantages of assigning a portion metric to a set of servers and distributing a service request in accordance with such portion metric assignments are numerous. The present invention may be used to allow capabilities of each candidate server to be taken into consideration during distribution of each server request. By way of example, portion metric assignments may be used to maximize the throughput of a distributed system having servers with diverse processor speeds. Similarly, portion metrics may be reassigned upon a determination that a server is unavailable.

DETAILED DESCRIPTION OF THE PREFERRED EMBODIMENTS

The present invention provides a method and system for redirecting traffic among a number of servers. This is accomplished through ascertaining the host for the client, determining a plurality of servers associated with the host, and selecting one of the plurality of servers. The selection may be based upon defined portion metrics as well as other metrics. Various embodiments of the invention are possible. By way of example, the present invention may be implemented in accordance with the Domain Name System as well as the HTTP protocol. In addition, the invention can be implemented in numerous ways, including as a method, an apparatus such as a switching element (e.g., router or brouter), or a computer readable medium. Several embodiments of the invention are discussed below.

Figure 1:
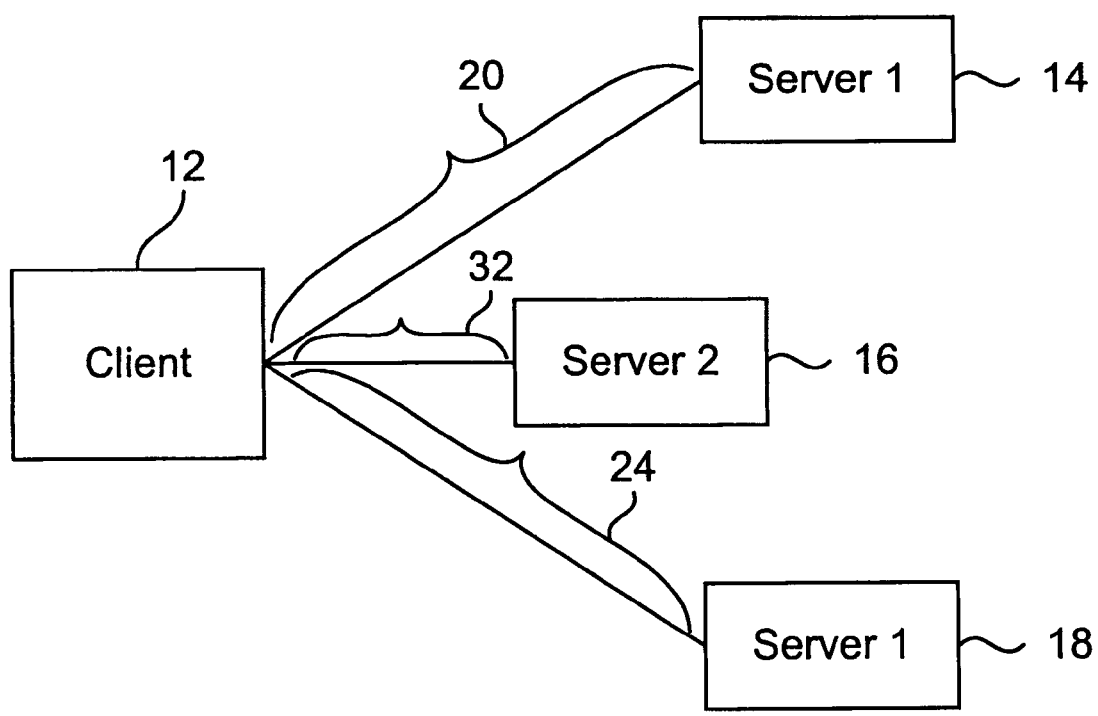
FIG. 1 is a block diagram illustrating an exemplary distributed system in which the portion metric of the present invention may be implemented.

Referring first to FIG. 1, a block diagram illustrating an exemplary distributed system in which the portion metric of the present invention may be implemented is presented. A distributed system 10 will typically include one or more clients 12 and a plurality of servers. As illustrated, the plurality of servers includes a first server 14, a second server 16, and a third server 18. Typically, a client 12 will send a request for a service which will be distributed to one of the plurality of servers. To distribute each such service request, one or more metrics may be used in the selection process. In a commonly used metric, the service request is distributed to the server closest in distance to the client. The first server 14 is a first distance 20 from the client 12, the second server 16 is a second distance 22 from the client 12, and the third server 18 is a third distance 24 from the client 12. As shown, the second distance 22 indicates that the second server 16 is closest in distance to the client 12. Accordingly, the service request would be distributed to the second server 16 if such a metric were applied. However, in circumstances where each one of the plurality of servers 14, 16, 18 is equidistant from the client 12, another metric may be used as a "tie breaker." Moreover, the distance between the client and selected server may be deemed insignificant in comparison to factors such as the processor speed of each available server. In such instances, an alternate metric may be desirable.

Figure 2:
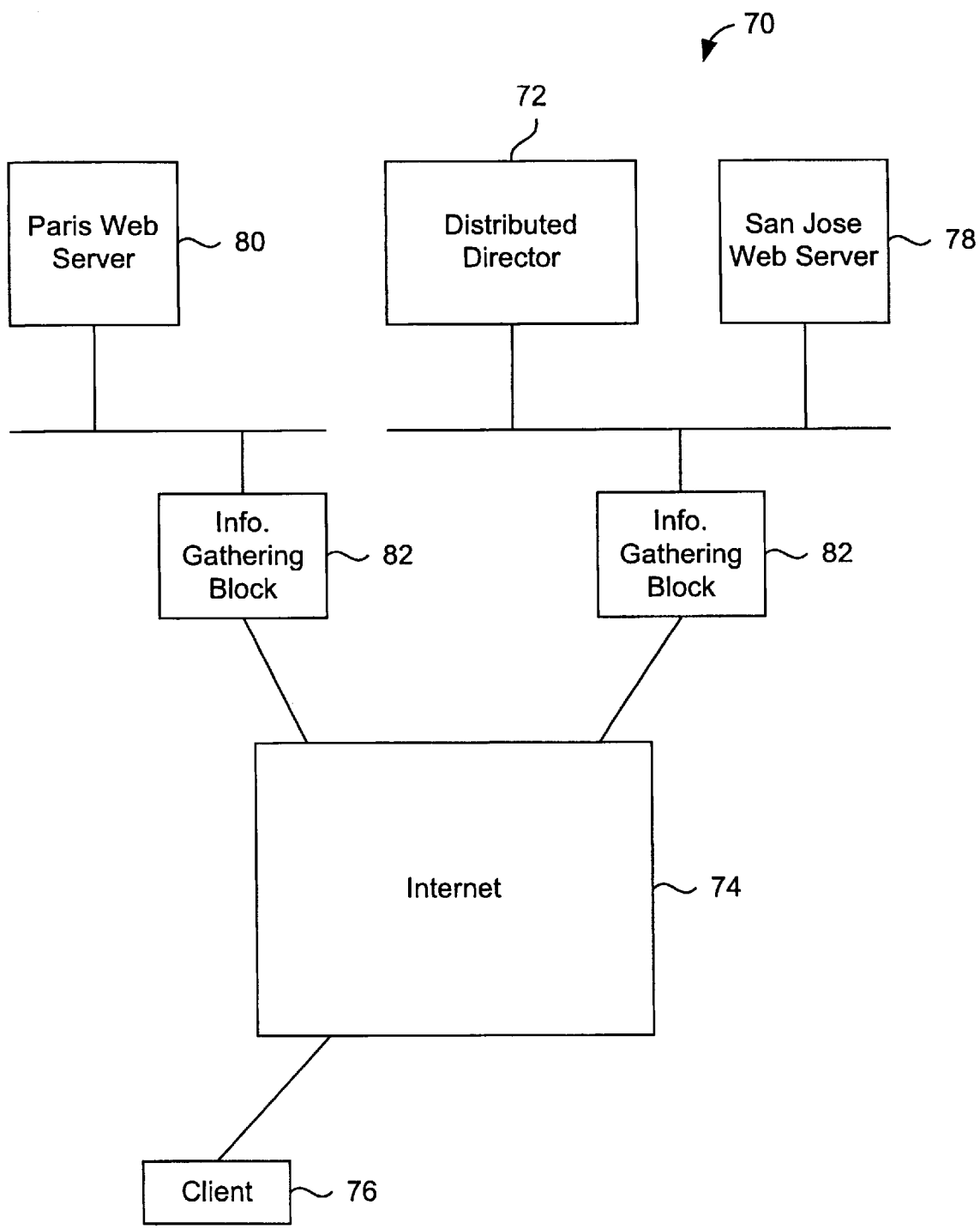
FIG. 2 is a block diagram illustrating a distributed system in which the distributed director of the present invention is implemented.

Referring next to FIG. 2, a block diagram of a distributed system in which the distributed director of the present invention according to one embodiment is presented. A distributed system 70 in which the present invention may be implemented is illustrated. According to the present invention, a distributed director 72 may be provided for each host. As shown, the distributed director 72 is provided for an Internet host 74. As will be described, a client 76 connecting to the Internet 74 may wish to connect to a web server located in another geographical location. By way of example, the San Jose web server 78 and Paris web server 80 are shown. The distributed director 72 determines a host associated with the client 76 (e.g., patents.com). The distributed director 72 may be configured to be the primary DNS server for a particular host. Thus, once the host is determined, the IP addresses associated with this host may easily be obtained. In this manner, available web servers associated with these IP addresses are made available for selection.

In response to a server request, the distributed director 72 utilizes one or more metrics to select one of these web servers. Metrics utilized by the distributed director 72 may include a variety of metrics, including the distance metric. An information gathering block 82 may be utilized to gather metric information such as the distance to each server. The information gathering block 82 may include a router and therefore must have access to all routing tables relating to the geographically distributed Web servers. By way of example, the distributed director 72 may query the information gathering block 82 for distance metrics between the distributed servers 78, 80 and the client 76. According to one embodiment, the information gathering block 82 may include a Direct Response Protocol (DRP) agent, available from Cisco Technology, Inc., located in San Jose, Calif. In addition, the distributed director 72 provides a portion metric which allows capabilities of each candidate server to be taken into consideration during distribution of each server request. The distributed director 72 may therefore direct clients to an appropriate server that is also closest in distance. In this manner, the distributed director 72 provides dynamic, transparent, and scalable Internet traffic load distribution between multiple geographically dispersed servers.

Figure 3:
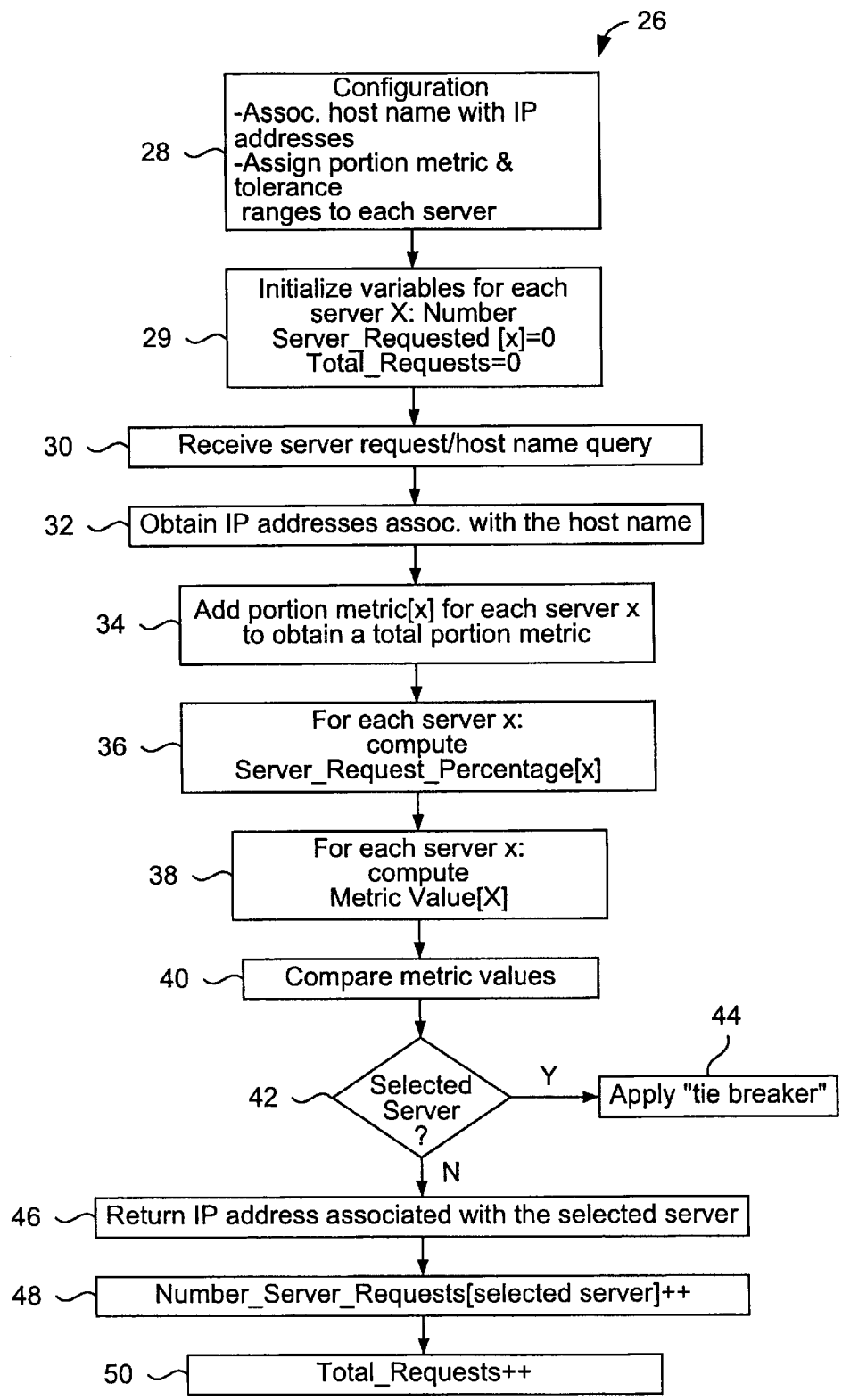
FIG. 3 is a flow diagram illustrating a method for operating the distributed director in DNS mode according to one embodiment of the present invention.

Referring next to FIG. 3, a flow diagram illustrating a method for operating the distributed director in DNS mode according to one embodiment of the invention is shown. As shown, a service request is distributed among a plurality of servers 26. First, at step 28, the distributed director is configured. Configuration may include associating each host with a plurality of IP addresses corresponding to a plurality of web servers in the distributed system, assigning a portion metric to each server, assigning other metrics to each server, and specifying a tolerance range for application of each specified metric.

A portion metric PORTION_METRIC[X] is assigned to each one of the plurality of servers, where X=1 to the total number of servers N. Each portion metric designates a portion of total server requests to be allocated to the corresponding one of the plurality of servers. For example, portion metrics 20%, 32%, and 60% may be assigned to three servers, respectively. The portion metrics do not necessarily need to total a value of one hundred. Thus, if percentages have been overassigned as in the previous example, then the percentage of server requests assigned to each server will automatically be scaled down by each server's portion metric such that they total 100% of requests and retain their relative configured portion of requests.

According to one embodiment, a portion metric is assigned to each server in the distributed system using the DNS host name. For example, "HOST SERVER1 PORTION 32" could be used to indicate that the portion of server requests for the DNS host "SERVER1" is 32. These portion metrics may then be used to determine a percentage of server requests to send to each server. Moreover, a default portion metric may be provided. By way of example, the default portion metric may be zero. As a result, servers with a higher portion metric will receive a larger number of server requests than servers with a lower portion metric. This allows a network administrator to adjust server load distribution across heterogeneous distributed servers, resulting in improved performance as seen by clients.

The portion metric may be used in combination with other metrics or alone to distribute server requests in a network or distributed system to select an appropriate server for each client. Similarly, any of these metrics may be turned off or on to add or remove metrics which are to be considered. For example, a command "PORTION X METRIC2 . . . " may be provided to add the portion metric and a second metric, "METRIC2". Similarly, a command "NO METRIC3" could be used to turn off a third metric, "METRIC3". When the portion metric is used in combination with other metrics, the order in which these metrics are considered is specified. By way of example, the first metric specified in the command line may be considered first, followed by each following metric specified.

In addition to specifying a portion metric as well as other metrics for each server, a tolerance range may be configured. The tolerance range supplies a range used to determine, relative to a lowest or highest value, whether any distributed servers should be equally preferred for a given client. For example, assume there are three servers: SERVER1, SERVER2 and SERVER3 associated with values 100, 119 and 125, respectively. If the tolerance value is set to 20 percent, SERVER1 (associated with value 100) and SERVER2 (associated with value 119) would be equally preferred since 119 is within the 20 percent tolerance range. SERVER3 (associated with value 125) would be eliminated from consideration.

The present invention may be configured to function in a DNS mode as well as in HTTP redirect mode. Additional DNS resource records must be added to the primary domain's primary DNS server to identify the distributed director as the authoritative name server for a given host in DNS mode, or as the actual Web server requested by the end user in HTTP redirect mode. Moreover, DNS resource records used by the distributed director may be configured in an external server or, alternatively, in the distributed director.

Next, at step 29, initialization of variables is performed. During this step, a variable storing a total number of server requests processed by the plurality of servers, TOTAL_REQUESTS, is initialized to a constant. In addition, a variable for each one of the plurality of servers storing a number of server requests distributed to each one of the plurality of servers, NUMBER_SERVER_REQUESTS[X] are each initialized to a constant. According to a preferred embodiment, the variables are initialized to zero. However, another constant may be used to avoid the potential problem of dividing by zero.

Once the distributed director is configured and initialization is performed, a server request may then be received at step 30. By way of example, the server request may include a DNS host name query that is received from a client. A DNS host name query typically includes a host name to be looked up and an indication that an IP address is requested.

After the server request is received, the portion metrics may be utilized as well as other metrics to select an appropriate server in response to each server request. According to one embodiment, each server request is distributed in accordance with the Domain Name System (DNS). At step 32, a plurality of IP addresses associated with the queried host name are obtained. Each one of the plurality of IP addresses are associated with one of a plurality of servers in the distributed system. In this manner, a set of servers are obtained from which one is to be selected. At step 34, the portion metrics for each one of the plurality of servers are added to obtain a total portion metric, TOTAL_PORTION.

In order to distribute the server request to an appropriate server, metric values for each one of the plurality of servers are computed. A metric value for a selected server X is computed using the number of server requests distributed to the selected server, the portion metric for the selected server, the total portion metric, and the total number of server requests processed by the distributed system where METRIC_VALUE[X]=SERVER_REQUEST_PERCENTAGE[X]–PORTION_METRIC[X]. At step 36, a server request percentage is calculated for each one of the plurality of servers. For each server, the server request percentage is calculated using the number of server requests distributed to the server, the total portion metric, and the total number of server requests received where SERVER_REQUEST_PERCENTAGE[X]=NUMBER_SERVER_REQUESTS[X]*TOTAL_PORTION/TOTAL_REQUESTS. Thus, the server request percentage is a percentage of total requests distributed to a server X which is normalized to the portion metric assignments. Next, at step 38, a metric value is determined for each one of the plurality of servers. For each server, the metric value is determined using the server request percentage for the server, the portion metric for the server, and the total number of server requests received. According to one embodiment, the metric value is obtained by subtracting the portion metric from the server request percentage, METRIC_VALUE[X]= SERVER_REQUEST_PERCENTAGE[X]–PORTION_METRIC[X]. However, a constant such as TOTAL_REQUESTS may be added to this value to ensure that the METRIC_VALUE [X] is a positive number.

If multiple metrics have been specified for each server, the metrics may be combined to form a single metric value prior to server selection. In addition, each metric or selected metrics may be assigned a weight during configuration indicating a metric priority. If multiple metrics have the same metric priority, the metrics may be added to obtain a composite metric. For example, if two metrics have the same metric value, the metric values may each be multiplied by their respective weight values (if specified) and then added together to form the composite metric for the corresponding server. According to one embodiment, the default weight values are set to 1.

The metric value for each one of the plurality of servers are then compared to choose one or more "selected" servers (e.g., a server having a lowest or highest metric value) at step 40. In the embodiment described below, it is assumed that the server having the lowest metric value is selected. Moreover, a set of the plurality of servers having metric values within the tolerance range may be "selected".

If multiple servers are determined to have been "selected" at step 42 (the metric values associated with the selected servers are within the tolerance range), an alternate metric may be used as a "tie breaker" at step 44. By way of example, the server closest in distance to the client may be selected. As yet another example, the next metric may be used to select the "best" server.

Next, at step 46, the IP address associated with the selected server is provided to the client from which the server request was obtained. By way of example, the IP address may be returned to the client's local DNS. Therefore, the server request is distributed using the portion metric assigned to each one of the plurality of servers, the number of server requests distributed to each one of the plurality of servers, and the total number of server requests as described above. As a result, the distributed director effectively functions as a DNS server. In this manner, a server request may be distributed in accordance with the DNS.

The tolerance range specified for each port ultimately determines the frequency that the portion metric is used to allocate server requests. By way of example, the first metric to be applied may be the portion metric and the second metric to be applied may be the distance metric. If the tolerance range for the portion metric is set to 20 percent, all servers having a metric value within 20 percent of the optimum metric value (e.g., lowest or highest metric value) will be considered to be equally desirable. In this case, the second distance metric is applied as a "tie breaker". Accordingly, the second distance metric will be used in all instances where two or more servers are within the tolerance range of an optimum metric value. As a result, the portion metric is used only in instances where only one server falls within this tolerance range. In other words, the portion metric will ultimately be used only to correct load imbalances according to the configured tolerance range, while a second metric (e.g., distance metric) will be applied when there is no load imbalance.

As described above, the frequency that the portion metric is applied may provide an indication of load imbalance. Monitoring the application of the portion metric will therefore indicate whether the load apportionment among the servers is appropriate. Accordingly, a counter may be incremented each time the portion metric is applied. This counter value may then be used to correct any load imbalance present in the distributed system.

Since the application of the portion metric (e.g., one server is selected according to the portion metric) will indicate the presence of a load imbalance within the distributed system, a report may be generated each time the portion metric is applied. The report may include information designed to assist in correcting load imbalance. By way of example, the report may include the number of server requests distributed to each server. Thus, the report will furnish the necessary information to allow a system administrator to reconfigure selected portion metrics and tolerance ranges, as well as modify the allocation of the servers. By way of example, the geographical distribution of the servers may be modified. As yet another example, additional servers may be added to a particular geographical location.

Once the server request has been distributed to a server, all variables are updated to reflect the receipt of a new server request as well as the allocation of the new server request to the selected server. At step 48, the number of server requests distributed to the selected server, NUMBER_SERVER_REQUESTS[SELECTED_SERVER] is increased. In this manner, the number of server requests distributed to each one of the plurality of servers is maintained. According to one embodiment, the number of server requests distributed to the selected server is increased in response to step 46. Similarly, at step 50, the total number of server requests processed by the plurality of servers, TOTAL_REQUESTS, is incremented.

The above steps may be modified or performed in an alternate order without departing from the scope of the invention. For example, according to a presently preferred embodiment, the total number of server requests processed by the plurality of servers is incremented in response to step 46. Accordingly, the total number of server requests is incremented by one. Alternatively, the total number of server requests may be computed as a sum of the number of server requests distributed to each one of the plurality of servers. As another example, the total number of server requests may be incremented in response to step 29. This would eliminate the possibility of a "divide by zero" error since the total number of server requests would be incremented prior to step 36.

Figure 4:
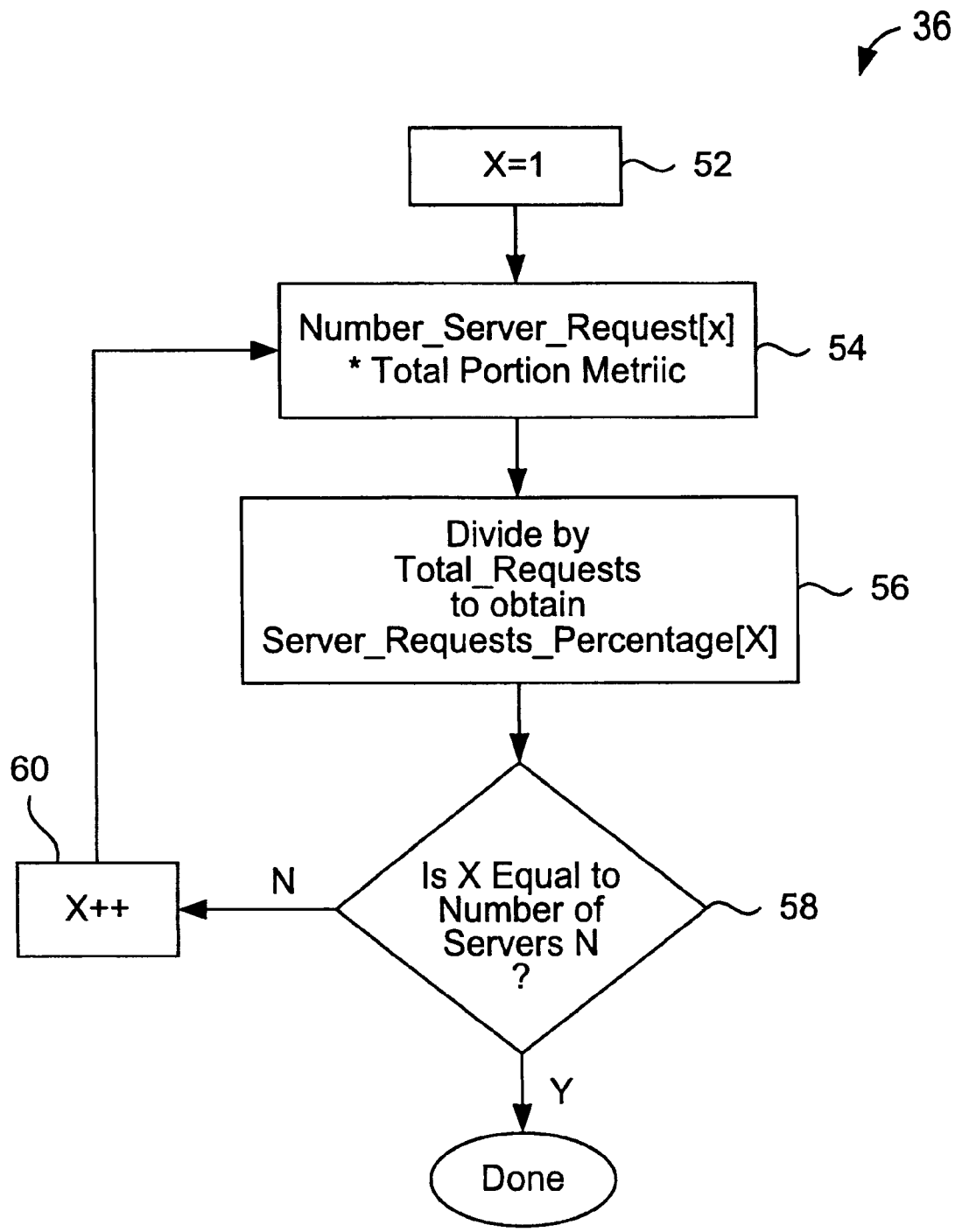
FIG. 4 is a flow diagram illustrating a method for calculating the server request percentage for one of the plurality of servers according to an embodiment of the present invention.

Referring now to FIG. 4, a flow diagram illustrating a method for calculating the server request percentage for each of the plurality of servers 36 shown in FIG. 2 according to an embodiment of the present invention is shown. At step 52, a first one of the plurality of servers is selected. For example, if the server request percentage for each of the plurality of servers is stored in an array, each one of the plurality of servers may be selected according to an index, X. As shown, the first index in such an array may be one. At step 54, the number of server requests distributed to the selected one of the plurality of servers and the total portion metric are multiplied to obtain a product. Next, at step 56, the product is divided by the total number of server requests received to obtain the server request percentage for the selected one of the plurality of servers. According to a preferred embodiment, in order to avoid dividing by zero, it is determined if the total number of server requests is equal to zero. If the total number of server requests is equal to zero, the server request percentage for the one of the plurality of servers is initialized to zero. Next, at step 58, it is determined whether the server request percentage for each of the plurality of servers has been calculated. For example, if the index, X, is equal to the number of servers N, all necessary calculations have been performed. However, if the index, X, is less than the number of servers, the server request percentage must be calculated for the remaining servers. At step 58, if the server request percentage has not been calculated for each of the servers, the index, X, is incremented at step 60, and the method continues at step 54.

Figure 5:
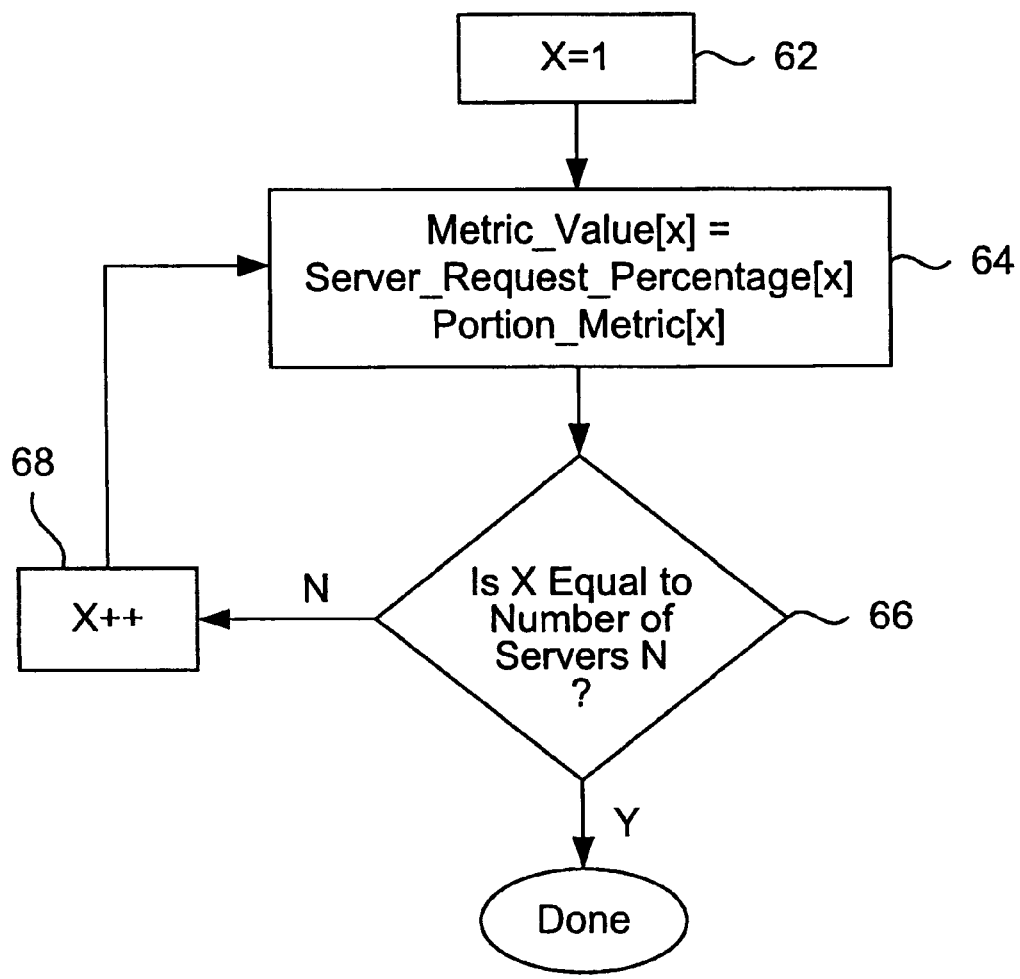
FIG. 5 is a flow diagram illustrating a method for determining the metric value for one of the plurality of servers according to one embodiment of the present invention.

Referring now to FIG. 5, a flow diagram illustrating a method for determining the metric value for each of the plurality of servers 38 shown in FIG. 2 according to one embodiment of the invention is illustrated. At step 62, a first one of the plurality of servers is selected. As described above, a server may be selected according to an index, X. At step 64, the portion metric associated with the selected one of the plurality of servers, PORTION_METRIC[X], is subtracted from the server request percentage for the selected one of the plurality of servers, SERVER_REQUEST_PERCENTAGE[X], to obtain a metric value for the selected one of the plurality of servers, METRIC_VALUE[X]. Thus, METRIC_VALUE[X]=SERVER_REQUEST_PERCENTAGE[X]−PORTION_METRIC[X]). In addition, as described above, a constant such as TOTAL_REQUESTS may be added to this value to ensure that the METRIC_VALUE[X] is a positive number. Next, at step 66, it is determined whether the metric value for each of the plurality of servers has been calculated. For example, if the index, X, is equal to the number of servers N, all necessary calculations have been performed. However, if the index, X, is less than the number of servers, the metric value must be calculated for the remaining servers. At step 66, if the metric value has not been calculated for each of the servers, the index, X, is incremented at step 68, and the method loops at step 64 until the metric value for each server has been calculated.

Figure 6:
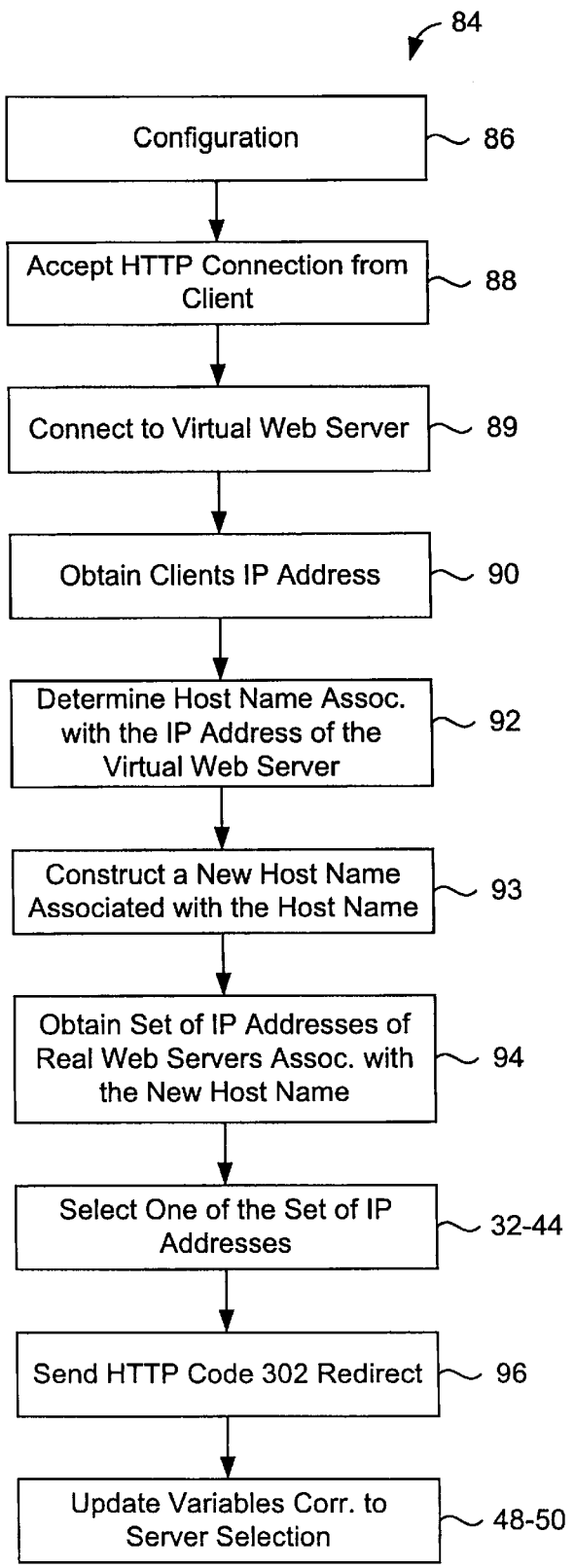
FIG. 6 is a flow diagram illustrating a method for operating the distributed director in HTTP redirect mode according to one embodiment of the invention.

According to another embodiment of the invention, the distributed director operates in HTTP redirect mode in accordance with the HTTP protocol. Referring now to FIG. 6, a method for operating the distributed director in HTTP redirect mode 84 is presented. The distributed director is configured at step 86. Configuration may include associating each host with a plurality of IP addresses corresponding to a plurality of web servers in the distributed system, assigning a portion metric to each server, assigning other metrics to each server, and specifying a tolerance range for application of each specified metric as described above in step 28. Next, at step 88, an HTTP connection is accepted from a client. Thus, the distributed director operates as though it were a web server. The distributed director has an IP address as well as a different IP address used by a web redirector. As a result, the client may communicate with the web redirector by connecting to the web redirector's IP address. The web redirector may then redirect connections through the use of virtual web servers. By way of example, a different host (and IP address) is associated with each set of virtual servers. The client is then connected to one of a set of virtual web servers associated with the distributed director at step 89. The client's IP address is then obtained at step 90 since it is later used to send an HTTP redirect. A host name (e.g., www.cisco.com) associated with the IP address of the virtual web server connected to is then determined at step 92. This may be performed via a DNS server, as described above.

Once the client is connected to the virtual web server, it is desirable to obtain a set of IP addresses from which to select an IP address and send an HTTP code redirect. One problem which may occur when a set of IP addresses associated with the host name of the virtual server is obtained is that the IP address of the virtual web server connected to may ultimately be selected. Since it would be extremely undesirable to select the virtual web server that the client is connected to, a new host name different from the host name of the virtual server connected to may be constructed. At step 93, a new host name associated with the host name determined in step 92 is constructed. By way of example, a string may be appended to the host name of the virtual server that the client is connected to. A set of IP addresses of real web servers associated with the new host name are then obtained at step 94. By way of example, the real web servers may be associated with the new host name in a DNS server. In this manner, the IP address of the virtual web server connected to may be excluded, or filtered, from selection.

Once the set of IP addresses are obtained, an IP address may be selected. As shown in FIG. 6, one of the set of IP addresses may be selected according to steps 32 through 44 described above. At that time, the client's IP address may be used in the selection process depending on the metric(s) applied. By way of example, the distance metric may use the client's IP address to ascertain the distance between a server and the client. The distributed director then sends to the client the HTTP status code "302 temporarily moved" with a URL for the selected server associated with the selected IP address at step 96. The client may then transparently connect to the selected web server specified by this URL. System variables may then be updated to reflect the server selection according to steps 48 through 50 described above. In this manner, a client may communicate with the server to which it has been redirected transparently through the distributed director web server. Accordingly, information provided to a client may be selectively varied according to the particular client requesting the information.

The present invention redirects clients to an appropriate server according to one or more metrics. This eliminates the need for end users to choose a server from a list of possible sites. In addition, since the distributed director localizes traffic to Internet servers, end users benefit from improved access performance and reduced transmission costs.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices. The computer readable medium can also be distributed over a distributed system between coupled computer systems so that the computer readable code is stored and executed in a distributed fashion.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented and capable of operating in DNS mode or HTTP redirect mode. However, it should be understood that the invention is not limited to such implementations, but instead would equally apply regardless of the context and system in which it is implemented. Thus, broadly speaking, the operations described above may be used to distribute traffic in a distributed system based on predefined server metrics. In addition, the above described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. A method for distributing a service request, the method comprising:

assigning a portion metric to each one of a plurality of servers, the portion metric designating a portion of total server requests to be allocated to the one of the plurality of servers;

accepting an HTTP connection;

incrementing a total number of server requests processed by the plurality of servers;

maintaining a number of server requests distributed to each one of the plurality of servers;

selecting one of the plurality of servers using the portion metric assigned to each one of the plurality of servers, the number of server requests distributed to each one of the plurality of servers, and the total number of server requests; and sending an HTTP code redirect.

2. A method for distributing a service request, the method comprising:

determining a metric value associated with each one of a plurality of servers;

configuring a tolerance range used in comparing the metric value for each one of the plurality of servers;

comparing the metric value for each one of the plurality of servers to obtain a set of the plurality of servers, each one of the set of the plurality of servers having a metric value within the tolerance range;

applying an alternate metric to the set of the plurality of servers to obtain a selected server when the set of the plurality of servers includes more than one server, and otherwise establishing that the selected server is the obtained set of the plurality of servers; and providing the selected server.

3. A method for distributing a service request, the method comprising:

associating each one of a plurality of servers with a Domain Name System host name, each one of the plurality of servers having a unique IP address;

assigning a portion metric to each one of the plurality of servers, the portion metric designating a portion of total server requests to be allocated to the one of the plurality of servers;

receiving a server request, the server request being a Domain Name System host name query including the Domain Name System host name;

incrementing a total number of server requests processed by the plurality of servers;

maintaining a number of server requests distributed to each one of the plurality of servers;

selecting one of the plurality of servers using the portion metric assigned to each one of the plurality of servers, the number of server requests distributed to each one of the plurality of servers, and the total number of server requests; and providing an IP address associated with the selected one of the plurality of servers.

4. The method as recited in claim 3, wherein selecting one of the plurality of servers further includes:

computing a metric value for each one of the plurality of servers using the number of server requests distributed to each one of the plurality of servers, the portion metric assigned to each one of the plurality of servers, and the total number of server requests processed; and comparing the metric value for each one of the plurality of servers to determine a selected server.

5. The method as recited in claim 4, wherein maintaining the number of server requests distributed to each one of the plurality of servers further includes:

increasing the number of server requests distributed for the selected server.

6. The method as recited in claim 4, wherein the selected server has a lowest metric value.

7. The method as recited in claim 4, wherein the selected server has a highest metric value.

8. The method as recited in claim 5, wherein increasing the number of server requests distributed is performed in response to distributing the server request.

9. The method as recited in claim 3, wherein incrementing the total number of server requests further includes:
   incrementing the total number of server requests in response to receiving the server request.

10. The method as recited in claim 3, wherein incrementing the total number of server requests further includes:
    incrementing the total number of server requests in response to distributing the server request.

11. The method as recited in claim 3, further including:
    if more than one server is selected, applying an alternate metric to a set of the plurality of servers to obtain a selected server.

12. The method as recited in claim 4, further including:
    configuring a tolerance range used in comparing the metric value for each one of the plurality of servers.

13. The method as recited in claim 12, wherein comparing the metric value for each one of the plurality of servers further includes:
    defining a set of the plurality of servers having metric values within the tolerance range and including the selected one of the plurality of servers; and
    applying an alternate metric to the set of the plurality of servers to obtain a selected one of the plurality of servers when the set of the plurality of servers includes more than one server, and otherwise establishing that the selected one of the plurality of servers is the set of the plurality of servers.

14. The method as recited in claim 12, wherein comparing the metric value for each one of the plurality of servers further includes:
    obtaining a set of the plurality of servers, each one of the set of the plurality of servers having a metric value within the tolerance range; and
    applying an alternate metric to the set of the plurality of servers to obtain a selected one of the plurality of servers when the set of the plurality of servers includes more than one server, and otherwise establishing that the selected one of the plurality of servers is the set of the plurality of servers.

15. The method as recited in claim 4, wherein computing the metric value for each one of the plurality of servers further includes:
    adding the portion metric for each one of the plurality of servers to obtain a total portion metric;
    calculating a server request percentage for each one of the plurality of servers using the number of server requests distributed to each one of the plurality of servers, the total portion metric, and the total number of server requests received; and
    determining a metric value for each one of the plurality of servers using the server request percentage distributed to each one of the plurality of servers and the portion metric assigned to each one of the plurality of servers.

16. The method as recited in claim 15, wherein calculating the server request percentage for each one of the plurality of servers further includes:
    calculating a server request percentage for one of the plurality of servers using the number of server requests for the one of the plurality of servers, the total portion metric, and the total number of server requests received.

17. The method as recited in claim 16, wherein calculating the server request percentage for the one of the plurality of servers includes:
    multiplying the number of server requests distributed to the one of the plurality of servers and the total portion metric to obtain a product; and
    dividing the product by the total number of server requests received to obtain a server request percentage for the one of the plurality of servers.

18. The method as recited in claim 15, wherein determining the metric value for each one of the plurality of servers further includes:
    determining a metric value for one of the plurality of servers using the server request percentage for the one of the plurality of servers and the portion metric for the one of the plurality of servers.

19. The method as recited in claim 18, wherein determining the metric value for the one of the plurality of servers further includes:
    subtracting the portion metric for the one of the plurality of servers from the server request percentage for the one of the plurality of servers to obtain a metric value for the one of the plurality of servers.

20. The method as recited in claim 18, wherein determining the metric value for the one of the plurality of servers further includes:
    subtracting the server request percentage for the one of the plurality of servers from the portion metric for one of the plurality of servers to obtain a metric value for the one of the plurality of servers.

21. The method as recited in claim 17, wherein dividing the product by the total number of server requests further includes:
    if the total number of server requests is equal to zero, initializing the server request percentage for the one of the plurality of servers to a value of zero; and
    if the total number of server requests is greater than zero, dividing the product by the total number of server requests received to obtain the server request percentage for the one of the plurality of servers.

22. The method as recited in claim 15, wherein calculating the server request percentage for each one of the plurality of servers further includes:
    assigning a value of zero to the server request percentage for each one of the plurality of servers when the total number of server requests is equal to zero.

23. The method as recited in claim 3, further including:
    initializing the total number of server requests and the number of server requests distributed to each one of the plurality of servers to a constant.

24. The method as recited in claim 23, wherein the constant is zero.

25. The method as recited in claim 3, wherein incrementing the total number of server requests further includes:
    adding the number of server requests distributed to each one of the plurality of servers to obtain the total number of server requests.

26. A method for distributing a service request, the method comprising:
    assigning a portion metric to each one of a plurality of servers, the portion metric designating a portion of total server requests to be allocated to the one of the plurality of servers;

adding the portion metric for each one of the plurality of servers to obtain a total portion metric;

maintaining a number of server requests distributed to each one of the plurality of servers;

receiving a server request;

incrementing a total number of server requests processed by the plurality of servers;

computing a server request percentage for each one of the plurality of servers, the server request percentage for one of the plurality of servers being a product of the number of server requests distributed to the one of the plurality of servers and the total portion metric divided by the total number of server requests received;

calculating a metric value for each one of the plurality of servers, the metric value for one of the plurality of servers being defined by the server request percentage for the one of the plurality of servers and the portion metric for the one of the plurality of servers;

comparing the metric value for each one of the plurality of servers to obtain a selected server;

applying an alternate metric to the selected server when the selected server includes more than one server; and providing the selected server.

27. The method as recited in claim 26, wherein the alternate metric is a distance metric.

28. The method as recited in claim 26, further including:

turning a plurality of metrics on, the plurality of metrics including the alternate metric.

29. The method as recited in claim 26, further including:

specifying an order in which each of the plurality of metrics is considered.

30. The method as recited in claim 26, further including:

specifying a priority for each one of the plurality of metrics.

31. The method as recited in claim 30, wherein specifying a priority further includes:

assigning a weight indicating a metric priority to one of the plurality of metrics.

32. A method for distributing a service request, the method comprising:

assigning a portion metric to each one of a plurality of servers, the portion metric designating a portion of total server requests to be allocated to the one of the plurality of servers;

adding the portion metric for each one of the plurality of servers to obtain a total portion metric;

maintaining a number of server requests distributed to each one of the plurality of servers;

receiving a server request;

incrementing a total number of server requests processed by the plurality of servers;

computing a server request percentage for each one of the plurality of servers, the server request percentage for one of the plurality of servers being a product of the number of server requests distributed to the one of the plurality of servers and the total portion metric divided by the total number of server requests received;

calculating a metric value for each one of the plurality of servers, the metric value for one of the plurality of servers being defined by the server request percentage for the one of the plurality of servers and the portion metric for the one of the plurality of servers;

configuring a tolerance range used in comparing the metric value for each one of the plurality of servers;

comparing the metric value for each one of the plurality of servers to obtain a set of the plurality of servers, each one of the set of the plurality of servers having a metric value within the tolerance range;

applying an alternate metric to the set of the plurality of servers to obtain a selected server when the set of the plurality of servers includes more than one server, and otherwise establishing that the selected server is the obtained set of the plurality of servers; and providing the selected server.

33. A method for detecting load imbalance within a distributed system, the method comprising:

assigning a portion metric to each one of a plurality of servers, the portion metric designating a portion of total server requests to be allocated to the one of the plurality of servers;

adding the portion metric for each one of the plurality of servers to obtain a total portion metric;

maintaining a number of server requests distributed to each one of the plurality of servers;

receiving a server request;

incrementing a total number of server requests processed by the plurality of servers;

computing a server request percentage for each one of the plurality of servers, the server request percentage for one of the plurality of servers being a product of the number of server requests distributed to the one of the plurality of servers and the total portion metric divided by the total number of server requests received;

calculating a metric value for each one of the plurality of servers, the metric value for one of the plurality of servers being defined by the server request percentage for the one of the plurality of servers and the portion metric for the one of the plurality of servers;

configuring a tolerance range used in comparing the metric value for each one of the plurality of servers;

comparing the metric value for each one of the plurality of servers to obtain a set of the plurality of servers, each one of the set of the plurality of servers having a metric value within the tolerance range;

detecting load imbalance when the set of the plurality of servers includes only one server; and applying an alternate metric to the set of the plurality of servers to obtain a selected server when the set of the plurality of servers includes more than one server, and otherwise establishing that the selected server is the obtained set of the plurality of servers.

34. The method as recited in claim 33, further including:

generating a report in response to the detection of load imbalance, the report including information designed to assist in correcting load imbalance.

35. The method as recited in claim 34, wherein the report includes the number of server requests distributed to each one of the plurality of servers.

36. The method as recited in claim 33, further including:

reassigning portion metrics for selected ones of the plurality of servers in response to the detection of load imbalance.

37. The method as recited in claim 33, further including:

reconfiguring the tolerance range in response to the detection of load imbalance.

* * * * *